United States Patent
Nakazawa et al.

(10) Patent No.: US 10,066,095 B2
(45) Date of Patent: Sep. 4, 2018

(54) ETHYLENE-VINYL ALCOHOL RESIN COMPOSITION, MULTILAYER STRUCTURE, MULTILAYER SHEET, CONTAINER, AND PACKAGING MATERIAL

(71) Applicant: KURARAY CO., LTD., Kurashiki-shi (JP)

(72) Inventors: Shogo Nakazawa, Kurashiki (JP); Hiroshi Kawai, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 719 days.

(21) Appl. No.: 14/407,136

(22) PCT Filed: Jun. 12, 2013

(86) PCT No.: PCT/JP2013/066277
§ 371 (c)(1),
(2) Date: Dec. 11, 2014

(87) PCT Pub. No.: WO2013/187454
PCT Pub. Date: Dec. 19, 2013

(65) Prior Publication Data
US 2015/0159005 A1    Jun. 11, 2015

(30) Foreign Application Priority Data

Jun. 13, 2012  (JP) ................................. 2012-134308

(51) Int. Cl.
| | |
|---|---|
| *C08L 29/06* | (2006.01) |
| *B32B 27/34* | (2006.01) |
| *C08L 29/04* | (2006.01) |
| *B32B 27/08* | (2006.01) |
| *B32B 27/32* | (2006.01) |
| *B32B 27/30* | (2006.01) |
| *A23L 3/10* | (2006.01) |
| *C08K 5/07* | (2006.01) |
| *C08K 5/098* | (2006.01) |
| *C08L 77/00* | (2006.01) |
| *B29C 49/04* | (2006.01) |
| *B29C 49/22* | (2006.01) |

(52) U.S. Cl.
CPC ................. *C08L 29/06* (2013.01); *A23L 3/10* (2013.01); *B32B 27/08* (2013.01); *B32B 27/306* (2013.01); *B32B 27/32* (2013.01); *B32B 27/34* (2013.01); *C08K 5/07* (2013.01); *C08K 5/098* (2013.01); *C08L 29/04* (2013.01); *C08L 77/00* (2013.01); *B29C 49/04* (2013.01); *B29C 49/22* (2013.01); *B29K 2995/0067* (2013.01); *B29K 2995/0069* (2013.01); *B32B 2274/00* (2013.01); *B32B 2439/00* (2013.01); *B32B 2439/70* (2013.01); *Y10T 428/1383* (2015.01); *Y10T 428/31725* (2015.04)

(58) Field of Classification Search
CPC .......... C08L 29/06; C08L 29/04; B32B 27/34; B32B 27/08; B32B 27/306; B32B 27/32; B32B 2274/00; A23L 3/10
USPC ........................................................ 428/36.7
See application file for complete search history.

(56) References Cited

U.S. PATENT DOCUMENTS

| | | | | |
|---|---|---|---|---|
| 3,725,360 | A | * | 4/1973 | Adams ................... C08F 222/08 526/146 |
| 4,387,191 | A | * | 6/1983 | Dufour ................... C08K 5/521 524/145 |
| 4,613,644 | A | * | 9/1986 | Moritani .................. C08K 3/22 524/239 |
| 2007/0148481 | A1 | * | 6/2007 | Onishi .................... B32B 27/08 428/474.4 |
| 2011/0269910 | A1 | * | 11/2011 | Chun ................... B29C 47/0021 525/205 |
| 2015/0041462 | A1 | | 2/2015 | Nakazawa et al. | |

FOREIGN PATENT DOCUMENTS

| | | | |
|---|---|---|---|
| CN | 1898088 A | | 1/2007 |
| JP | 60137915 A | * | 7/1985 |
| JP | 60-238345 A | | 11/1985 |
| JP | 4-131237 A | | 5/1992 |
| JP | 04131237 A | * | 5/1992 |
| JP | 6-23924 A | | 2/1994 |
| JP | 6-345919 A | | 12/1994 |
| JP | 6-345920 A | | 12/1994 |

(Continued)

OTHER PUBLICATIONS

Li Shengji, "Vinylon" Manufactured by Polyvinyl Alcohol, Volume One, Jun. 30, 1985, 16 Pages (with English translation).
Lo Jean Andrianof, "Practice Guide for Organic Chemistry" People's Medical Publishing House, Jul. 31, 1955, 15 Pages (with English translation).
U.S. Appl. No. 14/407,595, filed Dec. 12, 2014, Nakazawa, et al.
U.S. Appl. No. 14/384,564, filed Sep. 11, 2014, Nakazawa, et al., US2015/0041462 A1
U.S. Appl. No. 14/382,459, filed Sep. 2, 2014, Nakazawa, et al.
International Search Report dated Aug. 6, 2013 in PCT/JP2013/066277.

*Primary Examiner* — Michael M Bernshteyn
(74) *Attorney, Agent, or Firm* — Oblon, McClelland, Maier & Neustadt, L.L.P.

(57) ABSTRACT

The present invention provides a resin composition containing: an ethylene-vinyl alcohol copolymer (A) having an ethylene content of 20 mol % or more and 60 mol % or less; a polyamide resin (B); a carboxylic acid metal salt (C); and an unsaturated aldehyde (D), the mass ratio (A/B) of the ethylene-vinyl alcohol copolymer (A) to the polyamide resin (B) being 60/40 or more and 95/5 or less, the content of the carboxylic acid metal salt (C) with respect to a resin content in terms of a metal element equivalent being 1 ppm or more and 500 ppm or less, and the content of the unsaturated aldehyde (D) with respect to the resin content being 0.05 ppm or more and 50 ppm or less.

12 Claims, No Drawings

(56) References Cited

FOREIGN PATENT DOCUMENTS

| | | | |
|---|---:|---|---:|
| JP | 06345919 | A * | 12/1994 |
| JP | 06345920 | A * | 12/1994 |
| JP | 7-97491 | A | 4/1995 |
| JP | 07097491 | A * | 4/1995 |
| JP | 8-239528 | A | 9/1996 |
| JP | 8-253649 | A | 10/1996 |
| JP | 9-71620 | A | 3/1997 |
| JP | 10-80981 | A | 3/1998 |
| JP | 11-140136 | A | 5/1999 |
| JP | 2002-146135 | A | 5/2002 |
| JP | 2002146135 | A * | 5/2002 |
| JP | 2007-31725 | A | 2/2007 |
| JP | 2009-242645 | A | 10/2009 |
| JP | 2009242645 | A * | 10/2009 |
| JP | 2010-77352 | A | 4/2010 |
| JP | 2010077352 | A * | 4/2010 |
| JP | 2012-36341 | A | 2/2012 |
| WO | WO 2005/061224 | A1 | 7/2005 |

* cited by examiner

ETHYLENE-VINYL ALCOHOL RESIN COMPOSITION, MULTILAYER STRUCTURE, MULTILAYER SHEET, CONTAINER, AND PACKAGING MATERIAL

TECHNICAL FIELD

The present invention relates to a resin composition containing an ethylene-vinyl alcohol copolymer, a polyamide resin, a carboxylic acid metal salt and an unsaturated aldehyde, a multilayer structure and a multilayer sheet including the resin composition, as well as a container and a packaging material including the multilayer sheet.

BACKGROUND ART

Ethylene-vinyl alcohol copolymers (hereinafter, may be abbreviated as "EVOH(s)") are useful polymeric materials that are superior in barrier properties against various types of gases such as oxygen, oil resistance, antistatic properties, mechanical strength and the like; therefore, EVOHs have been molded into films, sheets, containers, packaging materials and the like, and widely used as various types of packaging materials and the like. In particular, laminates including an EVOH layer and other thermoplastic resin layer are known to be useful as packaging materials for boiling sterilization or retort sterilization of foods.

However, when the laminates are subjected to generally employed boiling or retorting processing using hot water, water penetrates into the EVOH layer during the processing, leading to deterioration of mechanical properties of the EVOH layer. As an improved method, blending the EVOH with a polyamide resin (hereinafter, may be abbreviated as "PA") having superior hot water resistance has been conventionally employed (hereinafter, suitability for such boiling or retorting processes may be also referred to as "retort resistance"), and in these days, as a method for further improving the retort resistance, the following methods have been developed: a method involving laminating a layer formed from a resin composition having the mass ratio of EVOH/PA of 55/45 or more and 97/3 or less as an outermost layer, and a layer formed from a thermoplastic resin having low moisture permeability as an inner layer (see Japanese Unexamined Patent Application, Publication No. H10-80981); a method involving incorporating a metal compound and/or a boric acid compound into an intermediate layer formed from a composition containing EVOH and PA (see Japanese Unexamined Patent Application, Publication No. H4-131237); and a method involving forming an intermediate layer from a composition containing two types of EVOHs and PA (see Japanese Unexamined Patent Application, Publication No. H6-23924).

However, in the resin compositions containing EVOH and PA, a crosslinking reaction may proceed between a hydroxyl group or a terminal carboxyl group of the EVOH and an amide group, a terminal amino group or a terminal carboxyl group of the PA, leading to nonuniformity of a resin viscosity, and thereby resulting in the generation of burnt deposits within an extruder, a screw and a die to be remarkable during melt molding for a long time period, and the like.

Such burnt deposits generated within the extruder, the screw and the die may remain therein for a certain time period and thereafter contaminate molded articles during a continuous operation for a long time period. The burnt deposits thus contaminating the molded articles not only deteriorate an appearance, but also cause defects to be formed, resulting in deterioration of various mechanical properties. Typically, in order to prevent the burnt deposits from contaminating molded articles, it is necessary to periodically shut down the operation and to carry out disassembly for cleaning of a line of extrusion equipment. However, an increase of the frequency of this procedure leads to not only an increase in production costs, but also consumption of materials required for the shutdown and restarting as well as a loss of production time; therefore, improvements have been desired in light of both resources and costs.

Although the technologies disclosed in the aforementioned documents achieves an improvement of the retort resistance, the technologies are insufficient in terms of the inhibition of the generation of burnt deposits within a molding machine in the operation for a long time period.

In addition, a production method of EVOH has been known in which crotonaldehyde is coexisted in a polymerization step of ethylene and vinyl acetate (see Japanese Unexamined Patent Application, Publication No. 2007-31725). When crotonaldehyde is coexisted in the polymerization step as described above, the adhesion of scales in the interior of a polymerization reactor can be suppressed, and as a result, fish eyes and the like in EVOH films resulting from the scales detached and contaminated in the polymer can be reportedly reduced.

However, in the production method disclosed in the aforementioned document, crotonaldehyde added in the polymerization is consumed in the polymerization step and a subsequent saponification step, and further washed away with water in a washing step and the like; therefore, crotonaldehyde hardly remains in a finally obtained EVOH-containing resin composition. Therefore, the resultant EVOH-containing resin composition is believed to fail to achieve the effect of reducing the fish eyes and the like in EVOH films described above.

As described in the foregoing, both improvement of the retort resistance of the resin composition and preclusion of the unfavorable appearance due to burnt deposits formed in an operation for a long time period has been difficult based on the conventional technologies.

PRIOR ART DOCUMENTS

Patent Documents

Patent Document 1: Japanese Unexamined Patent Application, Publication No. H10-80981
Patent Document 2: Japanese Unexamined Patent Application, Publication No. H4-131237
Patent Document 3: Japanese Unexamined Patent Application, Publication No. H6-23924
Patent Document 4: Japanese Unexamined Patent Application, Publication No. 2007-31725

SUMMARY OF THE INVENTION

Problems to be Solved by the Invention

The present invention was made in view of the foregoing circumstances, and an object of the invention is to provide a resin composition that is superior in both retort resistance and an ability to inhibit generation of burnt deposits in an operation for a long time period.

Means for Solving the Problems

According to an aspect of the invention made for solving the aforementioned problems, a resin composition comprises:

(A) an ethylene-vinyl alcohol copolymer (hereinafter, may be also referred to as "(A) EVOH" or "EVOH (A)") having an ethylene content of 20 mol % or more and 60 mol % or less; (B) a polyamide resin (hereinafter, may be also referred to as "(B) PA" or "PA (B)"); (C) a carboxylic acid metal salt; and (D) an unsaturated aldehyde, a mass ratio (A/B) of the ethylene-vinyl alcohol copolymer (A) to the polyamide resin (B) being 60/40 or more and 95/5 or less, a content of the carboxylic acid metal salt (C) with respect to a resin content in terms of a metal element equivalent being 1 ppm or more and 500 ppm or less, and a content of the unsaturated aldehyde (D) with respect to the resin content being 0.05 ppm or more and 50 ppm or less.

Due to containing the components (A) to (D), and to achieving the ratio of the ethylene-vinyl alcohol copolymer (A) to the polyamide resin (B), the content of the carboxylic acid metal salt (C), as well as the content of the unsaturated aldehyde (D) each falling within the specified range, the resin composition according to the aspect of the present invention is superior in both the retort resistance and the ability to inhibit generation of burnt deposits in an operation for a long time period. Although reasons for the achievement of the aforementioned effects by the resin composition are not necessarily clear, it can be presumed, for example, that when the ethylene-vinyl alcohol copolymer (A), the polyamide resin (B) that improves hot water resistance, the carboxylic acid metal salt (C) that inhibits the generation of gels and seeds (dirt under paint) in an operation for a long time period, and the unsaturated aldehyde (D) that inhibits the generation of burnt deposits within a molding machine in an operation for a long time period are each contained in the specified amount, the effects exerted by containing each component can be synergistically exhibited, and consequently the generation of burnt deposits within the molding machine in an operation for a long time period can be effectively inhibited while maintaining and/or improving the retort resistance, whereby an extension of a time period for continuous operation for the production is enabled.

The content of the carboxylic acid metal salt (C) with respect to the resin content in terms of a metal element equivalent is preferably 5 ppm or more.

According to the resin composition, when the content of the carboxylic acid metal salt (C) falls within the specified range, the generation of gels and seeds in an operation for a long time period can be further inhibited, and consequently the generation of burnt deposits in an operation for a long time period can be further inhibited, whereby a further improvement of the retort resistance is enabled.

A metal element of the carboxylic acid metal salt (C) is preferably at least one selected from the group consisting of magnesium, calcium and zinc.

When the carboxylic acid metal salt (C) is thus a carboxylic acid metal salt of the specified metal element, the generation of gels and seeds in an operation for a long time period can be further inhibited, and as a result, further inhibition of the generation of burnt deposits and a further improvement of the retort resistance are enabled.

The unsaturated aldehyde (D) is preferably an unsaturated aliphatic aldehyde, and more preferably at least one selected from the group consisting of crotonaldehyde, 2,4-hexadienal and 2,4,6-octatrienal. According to the resin composition, when the specified aldehyde is used as the unsaturated aldehyde (D), the retort resistance and the ability to inhibit the generation of burnt deposits described above can be further improved.

According to another aspect of the present invention, a multilayer structure includes:

a barrier layer formed from the resin composition according to the aspect of the present invention; and a thermoplastic resin layer laminated on at least one face of the barrier layer.

Moreover, according to still another aspect of the present invention, a multilayer sheet includes the multilayer structure according to the another aspect of the present invention.

Due to including the barrier layer formed from the resin composition exhibiting the aforementioned characteristics and the thermoplastic resin layer, the multilayer structure and the multilayer sheet exhibit superior appearance characteristics, retort resistance and processing characteristics.

According to the multilayer sheet, the barrier layer and the thermoplastic resin layer are preferably laminated using a coextrusion molding process.

When the two types of layers are laminated using the coextrusion molding process, the multilayer sheet can be easily and reliably produced, and as a result, an effective achievement of the superior appearance characteristics, retort resistance and processing characteristics is enabled.

According to yet still another aspect of the present invention, a container is obtained through molding of the multilayer sheet according to the still another aspect of the present invention using a vacuum-pressure forming process.

When the container is obtained through the molding of the aforementioned multilayer sheet using the vacuum-pressure forming process, the container can be easily and reliably produced, and consequently exhibits superior appearance characteristics and retort resistance.

The container is preferably for use in boiling sterilization or retort sterilization. Since the resin composition exhibiting the aforementioned properties is used, the container can be suitably used in the aforementioned intended usages.

According to even yet still another aspect of the present invention, a packaging material is obtained through molding of the multilayer sheet according to the still another aspect of the present invention using a heat-stretching process.

The packaging material can be easily and reliably produced through molding of the aforementioned multilayer sheet using the heat-stretching process, and consequently the packaging material formed from the stretched multilayer sheet exhibits superior appearance characteristics, and additionally exhibits suppressed occurrence of the unevenness in drawing.

Effects of the Invention

As explained in the foregoing, since the resin composition according to the aspect of the present invention can effectively inhibit the generation of burnt deposits within the molding machine in an operation for a long time period, a molded article that exhibits superior appearance characteristics, retort resistance and mechanical strength can be produced. The multilayer structure and the multilayer sheet according to the aspects of the present invention exhibit superior appearance characteristics, retort resistance and processing characteristics. The container according to the aspect of the present invention exhibits superior appearance characteristics and retort resistance. The packaging material according to the aspect of the present invention exhibits superior appearance characteristics and suppressed occurrence of the unevenness in drawing. Therefore, the resin composition, the multilayer structure, the multilayer sheet, the container and the packaging material are suitable for various types of packaging materials for boiling sterilization, retort sterilization, or the like.

DESCRIPTION OF EMBODIMENTS

Hereinafter, preferred embodiments for carrying out the present invention will be explained, but the present invention is not limited thereto. Moreover, unless otherwise specified particularly, materials illustrated may be used either alone, or two or more types thereof may be used in combination.

Resin Composition

A resin composition according to an embodiment of the present invention contains (A) EVOH, (B) PA, (C) a carboxylic acid metal salt and (D) an unsaturated aldehyde, the mass ratio (A/B) of the EVOH (A) to the PA (B) being 60/40 or more and 95/5 or less, the content of the carboxylic acid metal salt (C) with respect to a resin content in terms of a metal element equivalent being 1 ppm or more and 500 ppm or less, and the content of the unsaturated aldehyde (D) with respect to the resin content being 0.05 ppm or more and 50 ppm or less.

It is to be noted that the "resin content" means the total resin components including the EVOH (A) and the PA (B) as well as other resin which may be contained as an optional component described later.

The resin composition may contain an optional component such as a boron compound, a conjugated polyene compound and a phosphorus compound, within a range not leading to impairment of the effects of the present invention. Hereinafter, each component will be explained.

(A) EVOH

The EVOH (A) is an ethylene-vinyl alcohol copolymer obtained by saponifying an ethylene-vinyl ester copolymer.

The ethylene content of the EVOH (A) is 20 mol % or more and 60 mol % or less, preferably 20 mol % or more and 50 mol % or less, more preferably 24 mol % or more and 45 mol % or less, still more preferably 27 mol % or more and 42 mol % or less, and particularly preferably 27 mol % or more and 38 mol % or less. When the ethylene content is less than the lower limit, gelation of the resin composition becomes likely to occur due to decreased thermal stability in melt molding and the like, and thus defects such as streaks and fish eyes are likely to occur. In particular, when the operation is carried out for a long time period under conditions involving a higher temperature or higher speed than that in conditions for general melt extrusion, gelation of the resin composition become remarkable. On the other hand, when the ethylene content is greater than the upper limit, the gas barrier properties of the resin composition may be deteriorated, and inherent characteristics of the EVOH may not be maintained.

The lower limit of the degree of saponification of a vinyl ester unit in the EVOH (A) is preferably 85 mol %, more preferably 90 mol %, still more preferably 95 mol %, particularly preferably 98 mol %, and further particularly preferably 99 mol %. When the degree of saponification is less than the lower limit, thermal stability of the resin composition may be insufficient.

A typical vinyl ester used for producing the EVOH (A) is exemplified by vinyl acetate; however, in addition thereto, other fatty acid vinyl ester such as vinyl propionate and vinyl pivalate may be used.

The EVOH (A) can be produced by polymerizing ethylene and the vinyl ester; however, in addition thereto, a vinylsilane compound may be further used as a copolymer component. The percentage content of a unit derived from the vinylsilane compound in the EVOH (A) with respect to the total structural units constituting the EVOH (A) is typically 0.0002 mol % to 0.2 mol %.

Examples of the vinylsilane compound include vinyltrimethoxysilane, vinyltriethoxysilane, vinyltri(β-methoxyethoxy)silane, γ-methacryloxypropylmethoxysilane, and the like. Of these, vinyltrimethoxysilane and vinyltriethoxysilane are preferred.

Furthermore, in the production of the EVOH (A), other monomer(s) except for ethylene, vinyl esters and vinylsilane compounds may be used as a copolymer component, within a range not leading to impairment of the effects of the present invention.

Examples of the other monomer include:

unsaturated hydrocarbons such as propylene and butylene;

unsaturated carboxylic acids or esters thereof such as (meth)acrylic acid, methyl(meth)acrylate and ethyl(meth)acrylate;

vinylpyrrolidones such as N-vinylpyrrolidone; and the like.

(B) PA

The PA (B) is a resin that includes an amide linkage. The PA (B) is obtained through: ring-opening polymerization of a lactam having a 3 or more-membered ring; polycondensation of a polymerizable ω-amino acid; polycondensation of a dibasic acid and a diamine; and the like. Examples of the PA (B) include polycaproamide (nylon 6), poly-ω-aminoheptanoic acid (nylon 7), poly-ω-aminononanoic acid (nylon 9), polyundecaneamide (nylon 11), polylauryllactam (nylon 12), polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 106), caprolactam/lauryllactam copolymers (nylon 6/12), caprolactam/ω-aminononanoic acid copolymers (nylon 6/9), caprolactam/hexamethylenediammonium adipate copolymers (nylon 6/66), lauryllactam/hexamethylenediammonium adipate copolymers (nylon 12/66), hexamethylenediammonium adipate/hexamethylenediammonium sebacate copolymers (nylon 66/610), ethylene diammonium adipate/hexamethylenediammonium adipate copolymers (nylon 26/66), caprolactam/hexamethylenediammonium adipate/hexamethylenediammonium sebacate copolymers (nylon 6/66/610), polyhexamethylene isophthalamide (nylon 6I), polyhexamethylene terephthalamide (nylon 6T), hexamethylene isophthalamide/terephthalamide copolymers (nylon 6I/6T), and the like.

In addition, in the PA (B), a substituted aliphatic diamine such as 2,2,4- and 2,4,4-trimethylhexamethylenediamines, an aromatic amine such as methylbenzylamine and meta-xylylenediamine, or the like may be used as the diamine, or a modification of the polyamide resin with the same may be made. Furthermore, a substituted aliphatic carboxylic acid such as 2,2,4- and 2,4,4-trimethyladipic acids, an alicyclic dicarboxylic acid such as 1,4-cyclohexanedicarboxylic acid, an aromatic dicarboxylic acid such as phthalic acid, xylylenedicarboxylic acid, alkyl-substituted terephthalic acid, alkyl-substituted isophthalic acid and naphthalenedicarboxylic acid, or the like may be used as the dicarboxylic acid, or a modification of the polyamide resin with the same may be made.

These PAs (B) may be used alone or as a mixture of two or more types thereof. Of these PAs (B), polycaproamide (nylon 6) is preferred. Besides, caprolactam/lauryllactam copolymers (nylon 6/12) are also preferred. In this instance, the ratio of the nylon 6 unit and the nylon 12 unit is not particularly limited, but the percentage content of the 12 unit is preferably 5% by mass to 60% by mass, and more preferably 5% by mass to 50% by mass.

As far as the ratio of the EVOH (A) and the PA (B) in the resin composition is concerned, the lower limit of the mass ratio of the EVOH (A) to the PA (B) is 60/40, preferably 65/35, more preferably 70/30, and particularly preferably 75/25. In addition, the upper limit of the mass ratio is 95/5, preferably 90/10, and more preferably 85/15. When the mass ratio is less than the lower limit, characteristics such as barrier properties against various types of gases and oil resistance each inherently exhibited by the EVOH (A) are likely to be deteriorated. To the contrary, when the mass ratio is greater than the upper limit, the retort resistance of the resin composition may be deteriorated.

The total mass of the EVOH (A) and the PA (B) with respect to the resin content in the resin composition is preferably 80% by mass or more, more preferably 90% by mass or more, still more preferably 95% by mass or more, and particularly preferably 100% by mass.

(C) Carboxylic Acid Metal Salt

The resin composition contains a carboxylic acid metal salt (C). Due to containing the carboxylic acid metal salt (C), the resin composition can inhibit the generation of gels and seeds in an operation for a long time period.

Although a metal element of the carboxylic acid metal salt (C) is not particularly limited, metal elements that give a divalent metal salt, such as magnesium, calcium, barium, beryllium, zinc and copper, are preferred in light of the effect of inhibiting the gels and seeds (dirt under paint); among these, magnesium, calcium and zinc are more preferred.

An anion of the carboxylic acid metal salt (C) is not particularly limited as long as it is a carboxylic acid anion, and examples thereof include anions derived from a carboxylic acid such as formic acid, acetic acid, propionic acid, butyric acid, valeric acid, caproic acid, heptanoic acid, octanoic acid, nonanoic acid, decane acid, undecane acid, dodecanoic acid, stearic acid, dimethyldithiocarbamic acid, palmitic acid, 2-ethylhexanoic acid, neodecanoic acid, linoleic acid, tallic acid, oleic acid, capric acid and naphthenoic acid, and the like. Of these, an acetic acid anion is more preferred.

The lower limit of the content of the carboxylic acid metal salt (C) in terms of a metal element equivalent with respect to the resin content is 1 ppm, preferably 3 ppm, more preferably 5 ppm, and still more preferably 10 ppm. The upper limit of the content of the carboxylic acid metal salt (C) in terms of a metal element equivalent with respect to the resin content is 500 ppm, preferably 350 ppm, more preferably 200 ppm, and still more preferably 150 ppm. When the content is less than the lower limit, the resin composition may insufficiently exhibit the effect of inhibiting the gels and seeds in an operation for a long time period. When the content is greater than the upper limit, coloring of the resin composition may be remarkable, and deterioration through degradation reactions may be accelerated, leading to a failure to obtain EVOH having an adequate melt viscosity; as a result, appearance characteristics of molded articles obtained may be deteriorated, and it may be difficult to obtain desired molded articles. The content of the carboxylic acid metal salt (C) in the resin composition as referred to herein means a proportion with respect to the resin content in the resin composition, i.e., a proportion by mass in terms of a metal element equivalent with respect to the total mass of the resin component, and more specifically, the proportion with respect to the resin content in a dried resin composition. In the resin composition, the carboxylic acid metal salt (C) may be used either alone, or in combination of two or more types thereof.

(D) Unsaturated Aldehyde

The resin composition contains an unsaturated aldehyde (D). The unsaturated aldehyde (D) is an aldehyde having a carbon-carbon double bond or a carbon-carbon triple bond in its molecule. Due to containing the unsaturated aldehyde (D), the resin composition can inhibit the generation of burnt deposits within a molding machine in an operation for a long time period.

Examples of the unsaturated aldehyde (D) include unsaturated aliphatic aldehydes having a carbon-carbon double bond in their molecule such as acrylaldehyde (acrolein), crotonaldehyde, methacrylaldehyde, 2-methyl-2-butenal, 2-butenal, 2-hexenal, 2,6-nonadienal, 2,4-hexadienal, 2,4,6-octatrienal, 2-hexenal and 5-methyl-2-hexenal; unsaturated aliphatic aldehydes having a carbon-carbon triple bond such as propiolaldehyde, 2-butyn-1-al and 2-pentyn-1-al; aromatic unsaturated aldehydes such as benzylaldehyde and phenethylaldehyde; and the like. Of these, unsaturated aliphatic aldehydes are preferred, linear or branched unsaturated aliphatic aldehydes having a carbon-carbon double bond are more preferred, and at least one selected from the group consisting of crotonaldehyde, 2,4-hexadienal and 2,4,6-octatrienal is/are still more preferred. Of these, crotonaldehyde having a boiling point of about 100° C. and having a high solubility in water is particularly preferred because of ease in eliminating an excess, or supplying a shortage as needed in a washing step and/or a drying step, for example, of a production process of the EVOH (A). The unsaturated aldehyde (D) has preferably 3 to 10 carbon atoms, more preferably 4 to 8 carbon atoms, and still more preferably 4, 6 or 8 carbon atoms, including the carbon atom in the aldehyde moiety.

The lower limit of the content of the unsaturated aldehyde (D) with respect to the resin content is 0.05 ppm, preferably 0.1 ppm, and more preferably 0.15 ppm. Moreover, the upper limit of the content of the unsaturated aldehyde (D) with respect to the resin content is 50 ppm, preferably 30 ppm, and more preferably 20 ppm. When the content is less than the lower limit, the inhibition of the generation of burnt deposits within the molding machine may be insufficient. When the content is greater than the upper limit, in melt molding, the resin composition may be cross-linked owing to the unsaturated aldehyde (D), leading to the generation of gels and seeds (dirt under paint), and coloring is likely to occur. The content of the unsaturated aldehyde (D) in the resin composition as referred to herein means a proportion with respect to the resin content in the resin composition, i.e., a proportion by mass with respect to the total mass of the resin content, and more specifically, the proportion of the unsaturated aldehyde (D) with respect to the resin content in a dried resin composition.

Optional Components

Boron Compound

The resin composition may further contain a boron compound. When the resin composition further contains the boron compound, gelation is less likely to occur in melt molding, and a torque fluctuation of an extrusion molding machine and the like can be suppressed, resulting in an improvement of the appearance characteristics of the molded articles obtained.

Examples of the boron compound include:

boric acids such as orthoboric acid, metaboric acid and tetraboric acid;

boric acid esters such as triethyl borate and trimethyl borate;

boric acid salts such as alkali metal salts or alkaline earth metal salts of the aforementioned boric acids, and borax;

boron hydrides; and the like.

Of these, boric acids are preferred, and orthoboric acid is more preferred.

The content of the boron compound in the resin composition is preferably 100 ppm or more and 5,000 ppm or less, more preferably 100 ppm or more and 4,000 ppm or less, and still more preferably 150 ppm or more and 3,000 ppm or less. When the content of the boron compound falls within the above range, a torque fluctuation of an extrusion molding machine and the like in heat melting of the production process can be effectively suppressed. When the content of the boron compound is less than the lower limit, the effects may be insufficient, whereas when the content of the boron compound is greater than the upper limit, appearance characteristics may be insufficient since gelation of the resin composition is likely to occur.

Conjugated Polyene Compound

The resin composition may further contain a conjugated polyene compound. When the resin composition further contains the conjugated polyene compound, oxidative degradation in melt molding can be inhibited, and thus coloring and the generation of defects such as fish eyes can be further inhibited, whereby molded articles, such as containers, that are superior in appearance characteristics can be obtained, and long-run workability can also be improved.

The conjugated polyene compound as referred to means a compound having a conjugated double bond, as generally referred to, i.e., a compound having a structure in which two or more carbon-carbon double bonds are conjugated. The conjugated polyene compound may be a conjugated diene including two double bonds involved in the conjugation, a conjugated triene including three double bonds involved in the conjugation, or a conjugated polyene including four or more double bonds involved in the conjugation. In addition, the conjugated double bond may be present in a multiple number in a single molecule without being conjugated with one another. For example, compounds having three conjugated triene structures in the same molecule, such as tung oil, may also be included in the conjugated polyene compound.

The conjugated polyene compound preferably has 7 or less conjugated double bonds. When the resin composition contains a conjugated polyene compound having 8 or more conjugated double bonds, coloring of the molded articles is likely to occur. The conjugated polyene compound has preferably 4 to 30 carbon atoms, and more preferably 4 to 10 carbon atoms.

The conjugated polyene compound may include, in addition to the conjugated double bond, other functional group such as a carboxyl group and a salt thereof, a hydroxyl group, an ester group, a carbonyl group, an ether group, an amino group, an imino group, an amide group, a cyano group, a diazo group, a nitro group, a sulfonic acid group and a salt thereof, a sulfonyl group, a sulfoxide group, a sulfide group, a thiol group, a phosphoric acid group and a salt thereof, a phenyl group, a halogen atom, a double bond, and a triple bond.

Examples of the conjugated polyene compound include:

conjugated diene compounds such as isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnesene, cembrene, sorbic acid, sorbic acid esters, sorbic acid salts and abietic acid;

conjugated triene compounds such as 1,3,5-hexatriene, 2,4,6-octatriene-1-carboxylic acid, eleostearic acid, tung oil and cholecalciferol;

conjugated polyene compounds such as cyclooctatetraene, 2,4,6,8-decatetraene-1-carboxylic acid, retinol and retinoic acid; and the like. The conjugated polyene compound may be used either alone, or two or more types thereof may be used in combination.

Of these, sorbic acid, sorbic acid esters, sorbic acid salts, myrcene and a mixture of any two or more types thereof are preferred, and sorbic acid, sorbic acid salts and a mixture thereof are more preferred. Sorbic acid, sorbic acids salt and a mixture thereof exhibit superior suppressive effects on oxidative degradation at high temperatures, and are preferred also in light of hygienic properties and availability since they are industrially used broadly also as food additives.

The molecular weight of the conjugated polyene compound is typically 1,000 or less, preferably 500 or less, and more preferably 300 or less. When the molecular weight of the conjugated polyene compound is greater than 1,000, the state of dispersion in the EVOH (A) may be inferior, and thus the appearance characteristics after the melt molding may be unfavorable.

The content of the conjugated polyene compound is preferably 0.01 ppm or more and 1,000 ppm or less, more preferably 0.1 ppm or more and 1,000 ppm or less, still more preferably 0.5 ppm or more and 800 ppm or less, and particularly preferably 1 ppm or more and 500 ppm or less. In the resin composition, when the content of the conjugated polyene compound is less than 0.01 ppm, the effect of suppressing oxidation degradation in melt molding may not be sufficiently achieved. On the other hand, when the content of the conjugated polyene compound is greater than 1,000 ppm, gelation of the resin composition may be accelerated; therefore, unfavorable appearance characteristics of the molded articles are likely to be found.

Japanese Unexamined Patent Application, Publication No. H9-71620 discloses that when a conjugated polyene compound is added in a step following the polymerization step, a resin composition containing less gelatinous seeds generated can be obtained in molding; however, in the present invention, since the unsaturated aldehyde (D) is also added in addition to the conjugated polyene compound, coloring and the generation of defects such as fish eyes can be further inhibited, leading to an improvement of appearance characteristics of the molded articles, and additionally a resin composition also exhibiting superior long-run workability can be obtained.

Phosphorus Compound

The resin composition may further contain a phosphorus compound. When the resin composition further contains the phosphorus compound, coloring and the generation of defects such as gels and seeds can be further inhibited, and thus appearance characteristics can be improved.

Examples of the phosphorus compound include various types of phosphoric acids such as phosphoric acid and phosphorous acid, phosphates, and the like.

The phosphate may be in any form of a monobasic phosphate salt, a dibasic phosphate salt and a tribasic phosphate salt. In addition, the cationic species contained in the phosphate is not particularly limited. As the phosphate, alkali metal salts and alkaline earth metal salts are preferred, sodium dihydrogen phosphate, potassium dihydrogen phosphate, disodium hydrogen phosphate and dipotassium hydrogen phosphate are more preferred, and sodium dihydrogen phosphate and dipotassium hydrogen phosphate are still more preferred.

The content of the phosphorus compound is preferably 1 ppm or more and 200 ppm or less, more preferably 2 ppm or more and 200 ppm or less, still more preferably 3 ppm or more and 150 ppm or less, and particularly preferably 5 ppm or more and 100 ppm or less. When the content of the phosphorus compound is less than the lower limit, or is greater than the upper limit, thermal stability of the resin composition may be deteriorated in the production process, and thus coloring and the generation of gels and seeds become likely to occur, which may lead to insufficient appearance characteristics.

Other Optional Components

The resin composition may contain, as other optional component, a carboxylic acid such as acetic acid, an antioxidant, an UV absorbent, a plasticizer, an antistatic agent, a lubricant, a colorant, a filler, a heat stabilizer, other resin, a hydrotalcite compound, and the like. The resin composition may contain one, or two or more types of each of these other optional components. The content of these optional components is typically 1% by mass or less in total.

Examples of the antioxidant include 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl 3-(3',5'-di-t-butyl-4'-hydroxyphenyl)propionate, and the like.

Examples of the UV absorbent include ethylene 2-cyano-3,3'-diphenylacrylate, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone, and the like.

Examples of the plasticizer include dimethyl phthalate, diethyl phthalate, dioctyl phthalate, waxes, liquid paraffins, phosphoric acid esters, and the like.

Examples of the antistatic agent include pentaerythritol monostearate, sorbitan monopalmitate, sulfated polyolefins, polyethylene oxides, Carbowax (trade name), and the like.

Examples of the lubricant include ethylene bisstearamide, butyl stearate, and the like.

Examples of the colorant include carbon black, phthalocyanine, quinacridone, indoline, azo pigments, colcothar, and the like.

Examples of the filler include glass fibers, wollastonite, calcium silicate, talc, montmorillonite, and the like.

Examples of the heat stabilizer include hindered phenol compounds, hindered amine compounds, and the like.

Examples of the other resin include polyesters, polyolefins, and the like.

It is to be noted that in order to prevent generation of gels in the resin composition, one, or two or more types of heat stabilizers such as the hydrotalcite compound, the hindered phenol compounds and the hindered amine compounds may be added in an amount of 0.01% by mass to 1% by mass.

Production Method of Resin Composition

The production method of the resin composition is not particularly limited as long as the EVOH (A), the PA (B), the carboxylic acid metal salt (C) and the unsaturated aldehyde (D) can be homogeneously blended.

In a method for producing ethylene-vinyl alcohol copolymer including:

(1) copolymerizing ethylene with a vinyl ester; and (2) saponifying the copolymer obtained in the step (1), the procedure for homogeneously blending the unsaturated aldehyde (D) into the resin composition in the specified content with respect to the resin content may be exemplified by:

a procedure in which a specific amount of the unsaturated aldehyde (D) is added in the step (1);

a procedure in which a specific amount of the unsaturated aldehyde (D) is added in the step (2);

a procedure in which a specific amount of the unsaturated aldehyde (D) is added to the EVOH obtained in the step (2);

a procedure in which a specific amount of the unsaturated aldehyde (D) is added in blending the EVOH obtained in the step (2) with the polyamide resin;

a procedure in which the amount of the unsaturated aldehyde (D) which may be formed as degradation products or the like of a monomer such as ethylene and a vinyl ester is adjusted by regulating various types of conditions such as the amount of the monomer, the type and amount of a polymerization initiator, the polymerization temperature, and the polymerization time in the step (1);

a procedure in which the amount of the unsaturated aldehyde (D) which may be formed through degradation of the polymer main chain and the like is adjusted by regulating various types of conditions such as the type and amount of an alkali added, the reaction temperature, and the reaction time in saponifying the ethylene-vinyl ester copolymer in the step (2);

a procedure in which the abovementioned procedures are employed in combination; and the like.

It is to be noted that when the procedure in which a specific amount of the unsaturated aldehyde (D) is added in the step (1), or the procedure in which a specific amount of the unsaturated aldehyde (D) is added in the step (2) is employed, it is necessary for the addition to be carried out within a range not leading to inhibition of the polymerization reaction in the step (1) or the saponification reaction in the step (2).

Of these procedures, in light of the ease of regulating the content of the unsaturated aldehyde (D) in the resin composition, the procedure in which a specific amount of the unsaturated aldehyde (D) is added to the EVOH obtained in the step (2), and the procedure in which a specific amount of the unsaturated aldehyde (D) is added in blending the EVOH obtained in the step (2) with the polyamide resin are preferred, and the procedure in which a specific amount of the unsaturated aldehyde (D) is added to the EVOH obtained in the step (2) is more preferred.

The procedure for adding a specific amount of the unsaturated aldehyde (D) to the EVOH is exemplified by:

a procedure in which pelletizing is carried out after blending the unsaturated aldehyde (D) with the EVOH beforehand to give pellets;

a procedure in which a strand obtained by deposition of a paste after the saponification of the ethylene-vinyl ester copolymer is impregnated with the unsaturated aldehyde (D);

a procedure in which a strand obtained by deposition is impregnated with the unsaturated aldehyde (D) after cutting the strand;

a procedure in which the unsaturated aldehyde (D) is added to a solution of redissolved chips of a dry resin composition;

a procedure in which a blend of two components of the EVOH and the unsaturated aldehyde (D) is melt kneaded;

a procedure in which the unsaturated aldehyde (D) is fed to be contained in a melt of the EVOH during extrusion;

a procedure in which a masterbatch is produced by blending a high concentration of the unsaturated aldehyde (D) with a part of the EVOH and pelletizing the blend, the masterbatch is dry blended with the EVOH and the mixture is melt kneaded; and the like.

Of these, the procedure in which pelletizing is carried out after blending the unsaturated aldehyde (D) with the EVOH beforehand to give pellets is preferred in light of a possibility of more homogenously dispersing a slight amount of the unsaturated aldehyde (D) in the EVOH. Specifically, the unsaturated aldehyde (D) is added to a solution prepared by dissolving the EVOH in a good solvent such as a mixed solvent of water and methanol, and thus resulting mixture solution is extruded into a poor solvent through a nozzle or the like to allow for deposition and/or coagulation, followed by washing and/or drying the same, whereby the pellets including the unsaturated aldehyde (D) homogenously mixed with the EVOH can be obtained.

The resin composition can be obtained, for example, by mixing a resin composition containing the EVOH and the unsaturated aldehyde (D) with the PA and the carboxylic acid metal salt, for example, by melt kneading each component using a melt kneading apparatus. The blending method is not particularly limited, and a ribbon blender, a high speed mixer, a cokneader, a mixing roll, an extruder, an intensive mixer and the like may be employed for the blending.

Generally, single-screw or twin-screw screw extruders for use in melt blending a resin are most suitable, as described in Examples described later. The order of addition is not particularly limited, but a procedure in which the resin content containing the EVOH and the unsaturated aldehyde (D), the PA and the carboxylic acid metal salt are charged into an extruder simultaneously or in an appropriate order, and melt kneaded is suitably employed.

Molded Article

The resin composition is molded into various types of molded articles such as films, sheets, containers, pipes, hoses, fibers and packaging materials through melt molding and the like. Examples of the melt molding process include extrusion molding, inflation extrusion, blow molding, melt spinning, injection molding, injection blow molding, and the like. The melt molding temperature may vary in accordance with the melting point of the EVOH (A) and the melting point of the polyamide (B), and the like, but is preferably about 150° C. to 270° C.

The molded article obtained through the aforementioned melt molding and the like may be subjected to secondary processing molding such as bending processing, vacuum molding, blow molding and press molding as needed, to give a molded article as intended.

Although the molded article may be a molded article having a single-layer structure constituted with only a barrier layer formed from the resin composition (hereinafter, may be also referred to as "barrier layer"), the molded article preferably has a multilayer structure including the barrier layer and other layer laminated on at least one face the barrier layer, in light of an improvement of functions thereof. Due to including the barrier layer and the thermoplastic resin layer, the multilayer structure exhibits superior appearance characteristics, retort resistance and processing characteristics.

Examples of the multilayer structure include multilayer sheets, multilayer pipes, multilayer fibers, and the like.

The other layer constituting the multilayer structure is preferably, for example, a thermoplastic resin layer formed from a thermoplastic resin. Due to including the barrier layer and the thermoplastic resin layer, the multilayer structure exhibits superior appearance characteristics and heat stretching properties.

Examples of preferred resins for forming the thermoplastic resin layer include:

polyethylenes having a high, medium or low density;

polyethylenes prepared through copolymerization with vinyl acetate, an acrylic acid ester, or an $\alpha$-olefin such as butene and hexene;

ionomer resins;

polypropylene homopolymers;

polypropylenes prepared through copolymerization with an $\alpha$-olefin such as ethylene, butene and hexene;

polyolefins such as modified polypropylenes obtained by blending a rubber polymer into polypropylenes;

resins obtained by addition or grafting of maleic anhydride to these resins;

polyamide resins, polyester resins, polystyrene resins, polyvinyl chloride resins, acrylic resins, polyurethane resins, polycarbonate resins, polyvinyl acetate resins, and the like.

Of these, as the resin for forming the thermoplastic resin layer, polyethylenes, polypropylenes, polyamide resins and polyester resins are preferred. As a specific resin material for forming the thermoplastic resin layer, an unstretched polypropylene film and a nylon 6 film are preferred.

Although the layer structure of the multilayer structure is not particularly limited, in light of moldability, cost and the like, examples of a typical layer structure include those having: a thermoplastic resin layer/barrier layer/thermoplastic resin layer; a barrier layer/adhesive resin layer/thermoplastic resin layer; and a thermoplastic resin layer/adhesive resin layer/barrier layer/adhesive resin layer/thermoplastic resin layer. Of these layer structures, the layer structure having a thermoplastic resin layer/barrier layer/thermoplastic resin layer; or a thermoplastic resin layer/adhesive resin layer/barrier layer/adhesive resin layer/thermoplastic resin layer is preferred. In a case where the thermoplastic resin layers are provided on two outer sides of the barrier layer, respectively, the thermoplastic resin layers provided as two outer layers may be formed from resins different from each other, or may be formed from an identical resin.

Although a method for producing the multilayer structure is not particularly limited, examples thereof include an extrusion lamination process, a dry lamination process, an extrusion blow molding process, a coextrusion lamination process, a coextrusion molding process, a coextrusion pipe molding process, a coextrusion blow molding process, a coinjection molding process, a solution coating process, and the like.

Of these, the method for producing the multilayer sheet is preferably a coextrusion lamination process or a coextrusion molding process, and more preferably a coextrusion molding process. When the barrier layer and the thermoplastic resin layer are laminated using any of the aforementioned processes, the multilayer sheet can be easily and reliably produced, resulting in effective achievement of superior appearance characteristics, retort resistance and processing characteristics.

Examples of a process for forming a molded article using the multilayer sheet include a heat-stretching process, a vacuum molding process, a pressure forming process, a vacuum-pressure forming process, a blow molding process, and the like. These forming/molding processes are typically carried out at a temperature falling within the range of the melting point of the EVOH or below. Of these, a heat-stretching process and a vacuum-pressure forming process are preferred. In the heat-stretching process, the multilayer sheet is heated, and then stretched along one direction or a plurality of directions to achieve molding. In the vacuum-pressure forming process, the multilayer sheet is heated, and molded using a combination of a vacuum and a pressure. By way of an example of the molded article, a packaging material obtained through molding of the aforementioned multilayer sheet using the heat-stretching process can be easily and reliably produced, and additionally exhibit superior appearance characteristics and suppressed unevenness in drawing. Moreover, a container obtained through molding of the aforementioned multilayer sheet using the vacuum-pressure forming process can be easily and reliably produced, and additionally exhibit more superior appearance characteristics and retort resistance. In addition, these packaging material and container can exhibit inhibited flow marks.

In the heat-stretching process, the multilayer sheet extrusion-molded is preferably quenched immediately after the extrusion molding such that the multilayer sheet has a structure that is substantially as amorphous as possible. Subsequently, the multilayer sheet is again heated at a temperature falling within the range of the melting point of the EVOH or below, and uniaxially or biaxially stretched by a roll stretching method, a pantograph system stretching method, an inflation stretching method or the like. The draw ratio along the machine direction or/and the transverse direction is 1.3 to 9 times, and preferably 1.5 to 4 times in each direction, and the heating temperature is 50° C. to 140° C., and preferably 60° C. to 100° C. When the heating temperature is 50° C. or less, the stretching properties may be deteriorated, and changes of dimension may be significant.

In a case where the packaging material is produced from the multilayer sheet through the heat-stretching process, when the aforementioned resin is used as the thermoplastic resin, more superior appearance characteristics can be exhibited, and additionally defects such as cracks can be further inhibited.

Alternatively, the molded article can be molded through a coinjection stretch-blow molding process using the aforementioned resin composition and other resin composition. In the coinjection stretch-blow molding process, for example, a preformed material having the multilayer structure is obtained through coinjection molding using two or more types of resin compositions, and subsequently the preformed material is subjected to heat stretch-blow molding. Due to being molded using the resin composition exhibiting the aforementioned characteristics through the coinjection stretch-blow molding process, the molded article can be easily and reliably produced, and can exhibit superior appearance characteristics and inhibited flow marks. Examples of the other resin composition include the aforementioned thermoplastic resins, and the like.

It is to be noted that scraps generated in carrying out the heat molding and the like such as the extrusion molding and the blow molding may be reused through blending in the thermoplastic resin layer, or may be separately used as a recovery layer.

In the aforementioned vacuum-pressure forming process, the multilayer sheet is, for example, heated to be softened, and thereafter molded so as to fit a die shape. Examples of the molding process include a process in which molding is carried out so as to fit a die shape by means of vacuum or compressed air, which may be used in combination with a plug in addition, if necessary (a straight process, a drape process, an air slip process, a snap-back process, a plug-assist process, and the like), a press molding process, and the like. Various types of molding conditions such as the molding temperature, the degree of vacuum, the pressure of the compressed air and the molding speed may be appropriately determined in accordance with the shape of the plug and/or the die shape, as well as properties of a film and/or a sheet as a base material, and the like.

The molding temperature is not particularly limited as long as the resin is softened sufficiently to be molded at the temperature. For example, in a case where the multilayer sheet is subjected to heat molding, it is desired that the multilayer sheet is not exposed to: high temperatures at which melting of the multilayer sheet by heating occurs or the roughness of a metal plane of a heater plate is transferred to the multilayer sheet; or low temperatures at which shaping cannot be sufficiently attained. Specifically, the temperature of the multilayer sheet is 50° C. to 180° C., and suitably 60° C. to 160° C.

The container is produced by heat molding the multilayer sheet into a three-dimensional shape such that a recessed part is provided on the plane of the multilayer sheet. The container is suitably molded through the aforementioned vacuum-pressure forming process. The shape of the recessed part may be determined in accordance with the shape of contents. In particular, as the depth of the recessed part is greater, or as the shape of the recessed part is less smooth, the improvement effect exerted by the present invention is significant, since for such a shape of the recessed part, typical EVOH laminates are more likely to cause unevenness in thickness, leading to extreme slimming at corner portions and the like. In a case where the container is obtained through molding of a multilayer sheet having a total thickness of all layers of less than about 300 μm, the effects of the invention may be exhibited more effectively at a draw ratio (S) of suitably 0.2 or more, more suitably 0.3 or more, and still more suitably 0.4 or more. Alternatively, in a case where the container is obtained through molding of a multilayer sheet having a total thickness of all layers of about 300 μm or more, the effects of the invention may be exhibited more effectively at a draw ratio (S) of suitably 0.3 or more, more suitably 0.5 or more, and still more suitably 0.8 or more.

The draw ratio (S) as referred to herein means a value calculated using the following equation (1):

$$S = (\text{a depth of the container})/(\text{a maximum diameter of a circle inscribed in the opening of the container}) \quad (1)$$

In other words, the draw ratio (S) is a value obtained by dividing a value of the depth of the bottom of the recessed part of the container by a value of the diameter of the largest inscribed circle tangent to the shape of the recessed part (opening) provided on the plane of the multilayer sheet. For example, when the shape of the opening of the recessed part is circular, the value of the diameter of an inscribed circle having a maximum diameter means a diameter of the circular shape; when the shape of the opening of the recessed part is elliptical, the value of the diameter of an inscribed circle having a maximum diameter means a minor axis of the elliptical shape; and when the shape of the opening of the recessed part is rectangular, the value of the diameter of an inscribed circle having a maximum diameter means a length of the shorter side of the rectangular shape.

EXAMPLES

Hereinafter, the present invention is specifically explained by way of Examples, but the present invention is not in anyhow limited to these Examples. It is to be noted that each quantitative determination in these Examples was carried out using the following method.
Ethylene Content and Degree of Saponification of EVOH (A)

The determination was made based on $^1$H-NMR recorded on a nuclear magnetic resonance spectrometer (model "JNM-GX-500", manufactured by JEOL, Ltd.) using DMSO-$d_6$ as a solvent for the measurement.
Quantitative Determination of Unsaturated Aldehyde (D)

A 2,4-dinitrophenylhydrazine (DNPH) solution was prepared by adding 50 mL of 1,1,1,3,3,3-hexafluoroisopropanol (HFIP), 11.5 mL of acetic acid and 8 mL of ion exchanged water to 200 mg of a 50% by mass aqueous DNPH solution. To 20 mL of this DNPH solution were added 1 g of pellets for measurement, and dissolved with stirring at 35° C. for 1 hour. Acetonitrile was added to this solution to permit deposition and sedimentation of the resin content, and the solution obtained after the filtration was concentrated to obtain an extracted sample. The extracted sample was analyzed for quantitative determination on high performance liquid chromatography under the following conditions. Thus, the amount of the unsaturated aldehyde (D) was quantitatively determined. It is to be noted that upon the quantitative determination, a calibration curve produced by allowing an authentic sample of each unsaturated aldehyde (D) to react with the DNPH solution was used. It is to be noted that the lower limit of detection of the unsaturated aldehyde (D) was 0.01 ppm.
    column: TSKgel 80 Ts (manufactured by Tosoh Corporation)
    mobile phase: water/acetonitrile (volume ratio: water/acetonitrile=52:48)
    detector: PDA (360 nm), TOF-MS
Synthesis of EVOH (A)

Synthesis Example 1

Using a 250 L pressure reactor, the polymerization was carried out under the following conditions to synthesize an ethylene-vinyl acetate copolymer.
    Amount Charged:
    vinyl acetate: 83.0 kg
    methanol: 17.4 kg
    2,2'-azobisisobutyronitrile: 66.4 g
    Polymerization Conditions:
    polymerization temperature: 60° C.
    pressure of ethylene in polymerization vessel: 3.9 MPa
    polymerization time: 3.5 hrs
The conversion of vinyl acetate in the polymerization was 36%. After sorbic acid was added to the resultant copolymerization reaction liquid, the liquid was supplied to a purge tower, and after unreacted vinyl acetate was eliminated from the top of the tower by introducing methanol vapor from the bottom of the tower, a 41% by mass methanol solution of the ethylene-vinyl acetate copolymer was obtained. This ethylene-vinyl acetate copolymer had an ethylene content of 32 mol %. This methanol solution of the ethylene-vinyl acetate copolymer was charged into a saponification reactor, and a solution of sodium hydroxide in methanol (80 g/L) was added so as to attain 0.4 equivalents with respect to the vinyl ester unit in the copolymer. Thereto was further added methanol to adjust the copolymer concentration of 20% by mass. The temperature of this solution was elevated to 60° C., and the reaction was allowed while blowing nitrogen gas into the reactor for about 4 hrs. This solution was then extruded from a die plate provided with a circular opening into water to permit deposition, followed by cutting to give pellets having a diameter of about 3 mm and a length of about 5 mm. After the pellets were subjected to deliquoring using a centrifugal separator, the pellets were washed by repeating an operation of the deliquoring after further adding a large amount of water to obtain pellets of the EVOH (A). The degree of saponification of the EVOH (A) thus obtained was 99.95 mol %.

Moreover, EVOHs (A) having a predetermined ethylene content (degree of saponification: 99.95 mol %) shown in Table 1 below were synthesized in a similar manner to the procedure described above.

Synthesis Example 2

Pellets were obtained by polymerizing, saponifying, pelletizing and washing in a similar manner to Synthesis Example 1 except that crotonaldehyde was supplied so as to be contained in an amount of 0.5 ppm with respect to the EVOH (A) during the polymerization. The degree of saponification of the EVOH (A) thus obtained was 99.95 mol %.
Preparation of Resin Composition Examples 1 to 12 and Comparative Examples 2 to 8

Twenty kg of the pellets obtained in Synthesis Example 1 described above were added to 180 kg of a mixed solvent of water and methanol (mass ratio: water/methanol=40/60), and the mixture was stirred at 60° C. for 6 hrs to completely dissolve the pellets. To the solution thus obtained were added a predetermined amount of crotonaldehyde and sorbic acid, and the mixture was further stirred for 1 hour such that crotonaldehyde was completely dissolved, whereby a resin solution was obtained. This resin solution was continuously extruded from a nozzle having a diameter of 4 mm into a coagulation bath containing a mixture of water and methanol (mass ratio: water/methanol=90/10) adjusted at 0° C. thereby permitting coagulation so as to give a strand form. This strand was introduced into a pelletizing machine to obtain porous resin composition chips. The resultant chips were washed with an aqueous acetic acid solution and ion exchanged water. The chips were separated from the washing liquid, followed by deliquoring, and thereafter were dried in a hot-air dryer at 80° C. for 4 hrs and further at 100° C. for 16 hrs to obtain crotonaldehyde-containing EVOH pellets. The content of crotonaldehyde in the obtained pellets was quantitatively determined using the aforementioned quantitative determination methods. Crotonaldehyde-containing EVOH pellets were prepared such that the content of crotonaldehyde was as shown in Table 1, by regulating the amount of crotonaldehyde added.

The crotonaldehyde-containing EVOH pellets prepared above and a polyamide resin (Ny1018A (nylon 6); manufactured by Ube Industries, Ltd.) as well as magnesium acetate tetrahydrate, zinc acetate dihydrate or calcium acetate dihydrate were mixed such that each content shown in Table 1 was attained. After dry blending, the blended matter was subjected to extrusion and pelletization using a twin-screw extruder (2D25W; manufactured by Toyo Seiki Seisaku-sho, Ltd.; 25 mmφ) in a nitrogen atmosphere under extrusion conditions involving a die temperature of 250° C. and a screw rotation speed of 100 rpm, whereby intended resin composition pellets were obtained.

Examples 13 and 14

Resin compositions were prepared in a similar manner to Examples 1 to 12 using the pellets obtained in Synthesis Example 1 described above and, as the unsaturated aldehyde (D), 2,4-hexadienal and 2,4,6-octatrienal in Example 13 and Example 14, respectively, in place of crotonaldehyde, and thereafter unsaturated aldehyde-containing EVOH pellets were obtained. It is to be noted that the content of the unsaturated aldehyde (D) in the obtained pellets was quantitatively determined using the aforementioned quantitative determination methods, whereby unsaturated aldehyde-containing EVOH pellets were prepared such that the content of the unsaturated aldehyde (D) in the obtained pellets shown in Table 1 was each attained. Furthermore, a polyamide resin (Ny1018A (nylon 6); manufactured by Ube Industries, Ltd.) and magnesium acetate tetrahydrate were mixed such that each content shown in Table 1 was attained. After dry blending, the blended matter was subjected to extrusion and pelletization using a twin-screw extruder (2D25W; manufactured by Toyo Seiki Seisaku-sho, Ltd.; 25 mmφ) in a nitrogen atmosphere under extrusion conditions involving a die temperature of 250° C. and a screw rotation speed of 100 rpm, whereby intended resin composition pellets were obtained.

Comparative Example 1

Twenty kg of the pellets obtained in Synthesis Example 2 described above were washed with an aqueous acetic acid solution and ion exchanged water. The chips were separated from the washing liquid, followed by deliquoring, and thereafter were dried in a hot-air dryer at 80° C. for 4 hrs and further at 100° C. for 16 hrs to obtain EVOH pellets.

The EVOH pellets prepared above, a polyamide resin (Ny1018A (nylon 6); manufactured by Ube Industries, Ltd.), and magnesium acetate tetrahydrate were mixed such that each content shown in Table 1 was attained. After dry blending, the blended matter was subjected to extrusion and pelletization using a twin-screw extruder (2D25W; manufactured by Toyo Seiki Seisaku-sho, Ltd.; 25 mmφ) in a nitrogen atmosphere under extrusion conditions involving a die temperature of 250° C. and a screw rotation speed of 100 rpm, whereby intended resin composition pellets were obtained.

Production of Multilayer Sheet

Using a single-screw extruding machine (D2020; manufactured by Toyo Seiki Seisaku-sho, Ltd.; D (mm)=20, L/D=20, compression ratio=2.0, screw: full flight), a single-layer film having a thickness of 20 μm was produced from the resin composition pellets obtained above in each Example or Comparative Example. In this production, each extrusion condition is as shown below.
extrusion temperature: 250° C.
screw rotation speed: 40 rpm
die width: 30 cm
roll drawing temperature: 80° C.
roll drawing speed: 3.1 m/min The single-layer film prepared above, a commercially available biaxially stretched nylon 6 film (Emblem ON; manufactured by Unitika Limited; thickness: 15 μm) and a commercially available unstretched polypropylene film (Tohcello CP; manufactured by Mitsui Chemicals Tohcello Inc.; thickness: 60 μm) were each cut into an A4 size piece. An adhesive for dry lamination was applied to both faces of the single-layer film, and then dry lamination was carried out such that the nylon 6 film was provided as an outer layer and the unstretched polypropylene film was provided as an inner layer. The laminated film thus obtained was dried at 80° C. for 3 min, whereby a dilution liquid was evaporated to obtain a transparent multilayer sheet having 3 layers. The adhesive for dry lamination used contained "TAKELAC A-385" (manufactured by Takeda Chemical Industries, Ltd.) as a base material, "TAKENATE A-50" (manufactured by Takeda Chemical Industries, Ltd.) as a curing agent and ethyl acetate as the dilution liquid. The amount of the adhesive applied was 4.0 g/m. After the lamination, aging was carried out at 40° C. for 3 days.

Evaluations

The resin compositions and the multilayer sheets obtained above were evaluated as in the following. The results of the evaluations are shown together in Table 1.

Ability to Inhibit Generation of Burnt Deposits

Using a single-screw extruding machine ("D2020"; manufactured by Toyo Seiki Seisaku-sho, Ltd.; D (mm)=20, L/D=20, compression ratio=2.0, screw: full flight), a single-layer film having a thickness of 20 μm was produced from the dry resin composition pellets obtained in each Example or Comparative Example. In this production, each condition is as shown below.
extrusion temperature: 250° C.
screw rotation speed: 40 rpm
die width: 30 cm
roll drawing temperature: 80° C.
roll drawing speed: 3.1 m/min A continuous operation was carried out under the conditions described above to produce a single-layer film, then the resin was changed to low density polyethylene (Novatec LF128, manufactured by Japan Polyethylene Corporation) after 8 hrs from the start of the operation, and film formation was carried out for 30 min under identical conditions. Thereafter, the die was disassembled and the low density polyethylene was removed, and the amount of burnt deposits attached to the surface of the die channel was determined. The ability to inhibit generation of burnt deposits was evaluated in accordance with the following evaluation criteria:
"A (favorable)": less than 0.01 g;
"B (somewhat favorable)": 0.01 g or more and less than 1.0 g; and
"C (unfavorable)": 1.0 g or more.

Retort Resistance of Molded Article

A pouch sealed along four sides and having an inside dimension of 12×12 cm was produced using the multilayer sheet obtained above. The content was water. This pouch was subjected to a retorting processing at 120° C. for 20 min using a retorting equipment (high-temperature and high-pressure cooking sterilization tester, RCS-40RTGN, manufactured by Hisaka Works, Ltd.). After the retorting processing, the surface water was wiped off, and the pouch was left to stand in a high temperature and high humidity chamber at 20° C. and 65% RH for 1 day, and then the retort resistance was evaluated. The retort resistance was evaluated to be "A (favorable)" in a case where the transparency was maintained, whereas to be "B (unfavorable)" in a case where uneven blooming was found.

TABLE 1

| | EVOH (A) | PA (B) | Carboxylic acid metal salt (C) | | Unsaturated aldehyde (D) | | Sorbic acid | Ability to inhibit generation of burnt deposits | Retort resistance |
|---|---|---|---|---|---|---|---|---|---|
| | (% by mass) | (% by mass) | metal type | content (ppm) | substance | content (ppm) | content (ppm) | | |
| Example 1 | 80 | 20 | Mg | 75 | crotonaldehyde | 0.09 | 200 | B | A |
| Example 2 | 80 | 20 | Mg | 75 | crotonaldehyde | 10 | 200 | A | A |
| Example 3 | 80 | 20 | Mg | 75 | crotonaldehyde | 42 | 200 | A | A |
| Example 4 | 80 | 20 | Mg | 75 | crotonaldehyde | 0.3 | 200 | A | A |
| Example 5 | 90 | 10 | Mg | 75 | crotonaldehyde | 0.3 | 200 | A | A |
| Example 6 | 65 | 35 | Mg | 75 | crotonaldehyde | 0.3 | 200 | A | A |
| Example 7 | 80 | 20 | Mg | 3 | crotonaldehyde | 0.3 | 200 | B | A |
| Example 8 | 80 | 20 | Mg | 300 | crotonaldehyde | 0.3 | 200 | A | A |
| Example 9 | 80 | 20 | Mg | 10 | crotonaldehyde | 0.3 | 200 | A | A |
| Example 10 | 80 | 20 | Mg | 150 | crotonaldehyde | 0.3 | 200 | A | A |
| Example 11 | 80 | 20 | Zn | 75 | crotonaldehyde | 0.3 | 200 | A | A |
| Example 12 | 80 | 20 | Ca | 75 | crotonaldehyde | 0.3 | 200 | A | A |
| Example 13 | 80 | 20 | Mg | 75 | 2,4-hexadienal | 0.3 | 200 | B | A |
| Example 14 | 80 | 20 | Mg | 75 | 2,4,6-octatrienal | 0.3 | 200 | B | A |
| Comparative Example 1 | 80 | 20 | Mg | 75 | crotonaldehyde | N.D. *1 | 200 | C | A |
| Comparative Example 2 | 80 | 20 | Mg | 75 | crotonaldehyde | 0.02 | 200 | C | A |
| Comparative Example 3 | 80 | 20 | Mg | 75 | crotonaldehyde | 92 | 200 | C | B |
| Comparative Example 4 | 80 | 20 | Mg | 0.5 | crotonaldehyde | 0.3 | 200 | C | A |
| Comparative Example 5 | 80 | 20 | Mg | 1,000 | crotonaldehyde | 0.3 | 200 | C | B |
| Comparative Example 6 | 98 | 2 | Mg | 75 | crotonaldehyde | 0.3 | 200 | A | B |
| Comparative Example 7 | 50 | 50 | Mg | 75 | crotonaldehyde | 0.3 | 200 | C | A |
| Comparative Example 8 | 80 | 20 | Mg | 75 | crotonaldehyde | 120 | 200 | C | B |

*1 less than detection limit (0.01 ppm)

As is clear from the results shown in Table 1, the resin compositions and the multilayer sheets according to Examples exhibited a superior ability to inhibit the generation of burnt deposits within the molding machine in an operation for a long time period and superior retort resistance. On the other hand, the resin compositions and the multilayer sheet according to Comparative Examples in which the content of the crotonaldehyde (D), the content of the carboxylic acid metal salt (C), or the EVOH/PA mass ratio did not fall within the respective predetermined range exhibited an inferior ability to inhibit the generation of burnt deposits within the molding machine or inferior retort resistance.

Production of Container

Example 15

The resin composition obtained in Example 4, polyolefin (a), polyolefin (a') and carboxylic acid-modified polyolefin (b) were charged into separate extruders under the following conditions for extrusion molding, and a multilayer sheet having a total thickness of all layers of 1,000 μm and having seven layers of four types constituting a structure of (a)/(a')/(b)/resin composition/(b)/(a')/(a) (thickness of each layer: 200 μm/225 μm/25 μm/100 μm/25 μm/225 μm/200 μm) was obtained using a coextrusion sheet molding apparatus.

Each Extruder and Extrusion Conditions:
extruder for the polyolefin (a): single screw, screw diameter 65 mm, L/D=22, temperature 200° C. to 240° C.;
extruder for the resin composition obtained in Example 4: single screw, screw diameter 40 mm, L/D=26, temperature 170° C. to 210° C.;
extruder for the carboxylic acid-modified polyolefin (b): single screw, screw diameter 40 mm, L/D=26, temperature 160° C. to 220° C.; and
extruder for the polyolefin (a'): single screw, screw diameter 40 mm, L/D=22, temperature 160° C. to 210° C.

Molding Conditions for Coextrusion Sheet Molding Apparatus:
feed block die (width: 600 mm), temperature 240° C.

The obtained multilayer sheet was heated for 1.5 sec in Thermoformer (R530 manufactured by MULTIVAC) in which the temperature of a heater plate was adjusted to 100° C., whereby the temperature of the sheet was elevated to about 85° C. Thereafter, the sheet was placed in a die (giving a cuboid shape having a length of 130 mm, a width of 110 mm and a depth of 50 mm; draw ratio S=0.45), and then compressed air (pressure of 5 kgf/cm² (0.5 MPa)) was blown thereinto to execute molding, whereby a container was obtained. The container thus obtained was a favorable molded article exhibiting superior appearance characteristics with no burnt deposit.

Example 16

The multilayer sheet obtained in Example 15 was subjected to heat molding (compressed air: 5 kgf/cm² (0.5 MPa); plug: 45φ×65 mm; syntax form; plug temperature: 150° C.; die temperature: 70° C.) into a cup shape (die shape: 70φ×70 mm; draw ratio S=1.0) using a thermoforming machine (manufactured by Asano Laboratories Co. Ltd.)

at a temperature of the multilayer sheet of 150° C. The cup container thus obtained was a favorable molded article exhibiting superior appearance characteristics without unevenness in melting.

Production of Packaging Material

Example 17

The multilayer sheet obtained in Example 15 was mounted on a pantograph type biaxial stretching machine, and simultaneous biaxial stretching was carried out at 70° C. with a draw ratio of 3×3 times. After the stretching, unevenness in drawing was not found on the multilayer sheet.

Comparative Example 9

The resin composition obtained in Comparative Example 1, polyolefin (a), polyolefin (a') and carboxylic acid-modified polyolefin (b) were charged into separate extruders under the following conditions for extrusion molding, and a multilayer sheet having a total thickness of all layers of 1,000 μm and having seven layers of four types constituting a structure of (a)/(a')/(b)/resin composition/(b)/(a')/(a) (thickness of each layer: 200 μm/225 μm/25 μm/100 μm/25 μm/225 μm/200 μm) was obtained using a coextrusion sheet molding apparatus.

Each Extruder and Extrusion Conditions:
  extruder for the polyolefin (a): single screw, screw diameter 65 mm, L/D=22, temperature 200 to 240° C.;
  extruder for the resin composition obtained in Comparative Example 1: single screw, screw diameter 40 mm, L/D=26, temperature 170 to 210° C.;
  extruder for the carboxylic acid-modified polyolefin (b): single screw, screw diameter 40 mm, L/D=26, temperature 160 to 220° C.; and
  extruder for the polyolefin (a'): single screw, screw diameter 40 mm, L/D=22, temperature 160 to 210° C.

Molding Conditions for Coextrusion Sheet Molding Machine:
  feed block die (width: 600 mm), temperature 240° C.

The obtained multilayer sheet was heated for 1.5 sec in Thermoformer (R530 manufactured by MULTIVAC) in which the temperature of a heater plate was adjusted to 100° C., whereby the temperature of the sheet was elevated to about 85° C. Thereafter, the sheet was placed in a die (giving a cuboid shape having a length of 130 mm, a width of 110 mm and a depth of 50 mm; draw ratio S=0.45), and then compressed air (pressure of 5 kgf/cm² (0.5 MPa)) was blown thereinto to execute molding, whereby a container was obtained. Burnt deposits were found on the container thus obtained.

Comparative Example 10

The multilayer sheet obtained in Comparative Example 9 was subjected to heat molding (compressed air: 5 kg/cm² (0.5 MPa); plug: 45φ×65 mm; syntax form; plug temperature: 150° C.; die temperature: 70° C.) into a cup shape (die shape: 74×70 mm; draw ratio S=1.0) using a thermoforming machine (manufactured by Asano Laboratories Co. Ltd.) at a temperature of the multilayer sheet of 150° C. Unevenness in melting was found on the cup container obtained.

Comparative Example 11

The multilayer sheet obtained in Comparative Example 9 was mounted on a pantograph type biaxial stretching machine, and simultaneous biaxial stretching was carried out at 70° C. with a draw ratio of 3×3 times. After the stretching, unevenness in drawing was found on the multilayer sheet.

INDUSTRIAL APPLICABILITY

The resin composition according to the present invention can effectively inhibit the generation of burnt deposits within a molding machine in an operation for a long time period, and enables a molded article that exhibits superior appearance characteristics, retort resistance and mechanical strength to be produced. The multilayer sheet according to the present invention exhibits superior appearance characteristics, retort resistance and processing characteristics. The container according to the present invention exhibits superior appearance characteristics and retort resistance. The packaging material according to the present invention exhibits superior appearance characteristics, and suppression of occurrence of the unevenness in drawing. Therefore, the resin composition, the multilayer sheet, the container and the packaging material are suitable for use in boiling sterilization, retort sterilization or the like.

The invention claimed is:

1. A resin composition, comprising:
   an ethylene-vinyl alcohol copolymer (A) comprising an ethylene content of from 20 mol % to 60 mol %;
   a polyamide resin (B);
   a carboxylic acid metal salt (C); and
   an unsaturated aldehyde (D),
   wherein:
   a mass ratio (A/B) of the ethylene-vinyl alcohol copolymer (A) to the polyamide resin (B) is from 60/40 to 95/5,
   a content of the carboxylic acid metal salt (C) with respect to a resin content in terms of a metal element equivalent is from 1 ppm to 500 ppm, and
   a content of the unsaturated aldehyde (D) with respect to the resin content is from 0.05 ppm to 50 ppm.

2. The resin composition according to claim 1 wherein the content of the carboxylic acid metal salt (C) with respect to the resin content in terms of a metal element equivalent is from 5 ppm to 500 ppm.

3. The resin composition according to claim 1, wherein the carboxylic acid metal (C) comprises a metal element, the metal element being at least one selected from the group consisting of magnesium, calcium and zinc.

4. The resin composition according to claim 1, wherein the unsaturated aldehyde (D) is an unsaturated aliphatic aldehyde.

5. The resin composition according to claim 4, wherein the unsaturated aliphatic aldehyde is at least one selected from the group consisting of crotonaldehyde, 2,4-hexadienal and 2,4,6-octatrienal.

6. A multilayer structure, comprising:
   a barrier layer comprising the resin composition according to claim 1; and
   a thermoplastic resin layer laminated on at least one face of the barrier layer.

7. A multilayer sheet, comprising:
   the multilayer structure according to claim 6.

8. The multilayer sheet according to claim 7, wherein the barrier layer and the thermoplastic resin layer are laminated using a coextrusion molding process.

9. A container, comprising:
the multilayer sheet according to claim 7,
wherein the container is obtained by molding the multilayer sheet using a vacuum-pressure forming process.

10. A method of processing food, the method comprising:
boiling or retort sterilizing the food in the container according to claim 9.

11. A packaging material, comprising:
the multilayer sheet according to claim 7,
wherein the packaging material is obtained by molding the multilayer sheet using a heat-stretching process.

12. The resin composition according to claim 1, wherein
the content of the carboxylic acid metal salt (C) is from 5 ppm to 500 ppm,
the content of the unsaturated aldehyde (D) is from 0.15 ppm to 50 ppm, and
the unsaturated aldehyde (D) is crotonaldehyde.

\* \* \* \* \*